US011747913B2

(12) United States Patent
Collier

(10) Patent No.: US 11,747,913 B2
(45) Date of Patent: Sep. 5, 2023

(54) ERGONOMIC KEYBOARD

(71) Applicant: Harold Eugene Collier, Mankato, MN (US)

(72) Inventor: Harold Eugene Collier, Mankato, MN (US)

(*) Notice: Subject to any disclaimer, the term of this patent is extended or adjusted under 35 U.S.C. 154(b) by 0 days.

(21) Appl. No.: 17/654,959

(22) Filed: Mar. 15, 2022

(65) Prior Publication Data

US 2022/0404918 A1 Dec. 22, 2022

Related U.S. Application Data

(60) Provisional application No. 63/163,537, filed on Jun. 16, 2021.

(51) Int. Cl.
*G06F 3/02* (2006.01)
*H01H 13/84* (2006.01)
*H01H 13/88* (2006.01)
*H01H 13/702* (2006.01)

(52) U.S. Cl.
CPC ......... *G06F 3/0213* (2013.01); *H01H 13/702* (2013.01); *H01H 13/88* (2013.01)

(58) Field of Classification Search
CPC .......... G06F 3/02; G06F 3/0213; G06F 3/021; H01H 13/702; H01H 13/88; H01H 13/70; H01H 41/08; H01H 13/84
See application file for complete search history.

(56) References Cited

U.S. PATENT DOCUMENTS

| | | | |
|---|---|---|---|
| 5,145,270 A | 9/1992 | Darden | |
| 5,416,498 A | 5/1995 | Grant | |
| 5,503,484 A * | 4/1996 | Louis | H01H 13/807 400/489 |
| 5,553,953 A | 9/1996 | Hernan et al. | |
| 6,443,643 B1 | 9/2002 | Camacho et al. | |
| 8,083,424 B2 | 12/2011 | Camacho et al. | |
| 8,427,428 B2 | 4/2013 | Linegar et al. | |
| 8,681,102 B2 | 3/2014 | Edenborough | |
| 9,182,829 B2 | 11/2015 | Linegar et al. | |
| 9,501,156 B2 | 11/2016 | Linegar et al. | |
| 2003/0043123 A1* | 3/2003 | Hinckley | G06F 3/021 345/173 |
| 2006/0291946 A1 | 12/2006 | Odell et al. | |
| 2007/0256913 A1* | 11/2007 | Wee | H01H 13/84 200/5 A |
| 2011/0050581 A1* | 3/2011 | Steenfeldt Berg | G06F 1/169 345/168 |
| 2011/0175811 A1* | 7/2011 | Edmister | G06F 3/021 345/161 |
| 2012/0176310 A1* | 7/2012 | Nair | G06F 1/1664 345/157 |
| 2016/0103503 A1* | 4/2016 | Pham | G06F 3/0208 345/170 |
| 2021/0142967 A1* | 5/2021 | Drory | G06F 3/0202 |

* cited by examiner

*Primary Examiner* — Pegeman Karimi
(74) *Attorney, Agent, or Firm* — Merchant & Gould P.C.

(57) ABSTRACT

An example keyboard can include: a base with a midpoint, a first end, and a second end opposite the first end; and a plurality of keys arranged on the base, wherein the plurality of keys is positioned to form a curved shape on the base such that the plurality of keys extend from the midpoint of the base towards a user as the plurality of keys extends towards the first end and the second end of the base.

14 Claims, 6 Drawing Sheets

ERGONOMIC KEYBOARD

RELATED APPLICATIONS

This patent application claims priority to U.S. Patent Application No. 63/163,537 filed on Mar. 19, 2021, the entirety of which is hereby incorporated by reference. This patent application relates to U.S. patent application Ser. No. 29/822,004 filed on Jan. 5, 2022, the entirety of which is hereby incorporated by reference.

BACKGROUND

People can spend many hours in front of keyboards as they work and play on computing devices. This can result in various health problems. Further, keyboards may not be optimized for input by all types of people, particularly those with underlying conditions that may impact their abilities to use the keyboards.

SUMMARY

Embodiments of the disclosure are directed to keyboards for computing devices.

According to aspects of the present disclosure, an example keyboard can include: a base with a midpoint, a first end, and a second end opposite the first end; and a plurality of keys arranged on the base, wherein the plurality of keys is positioned to form a curved shape on the base such that the plurality of keys extend from the midpoint of the base towards a user as the plurality of keys extends towards the first end and the second end of the base.

The details of one or more techniques are set forth in the accompanying drawings and the description below. Other features, objects, and advantages of these techniques will be apparent from the description, drawings, and claims.

DETAILED DESCRIPTION

Figure 1:
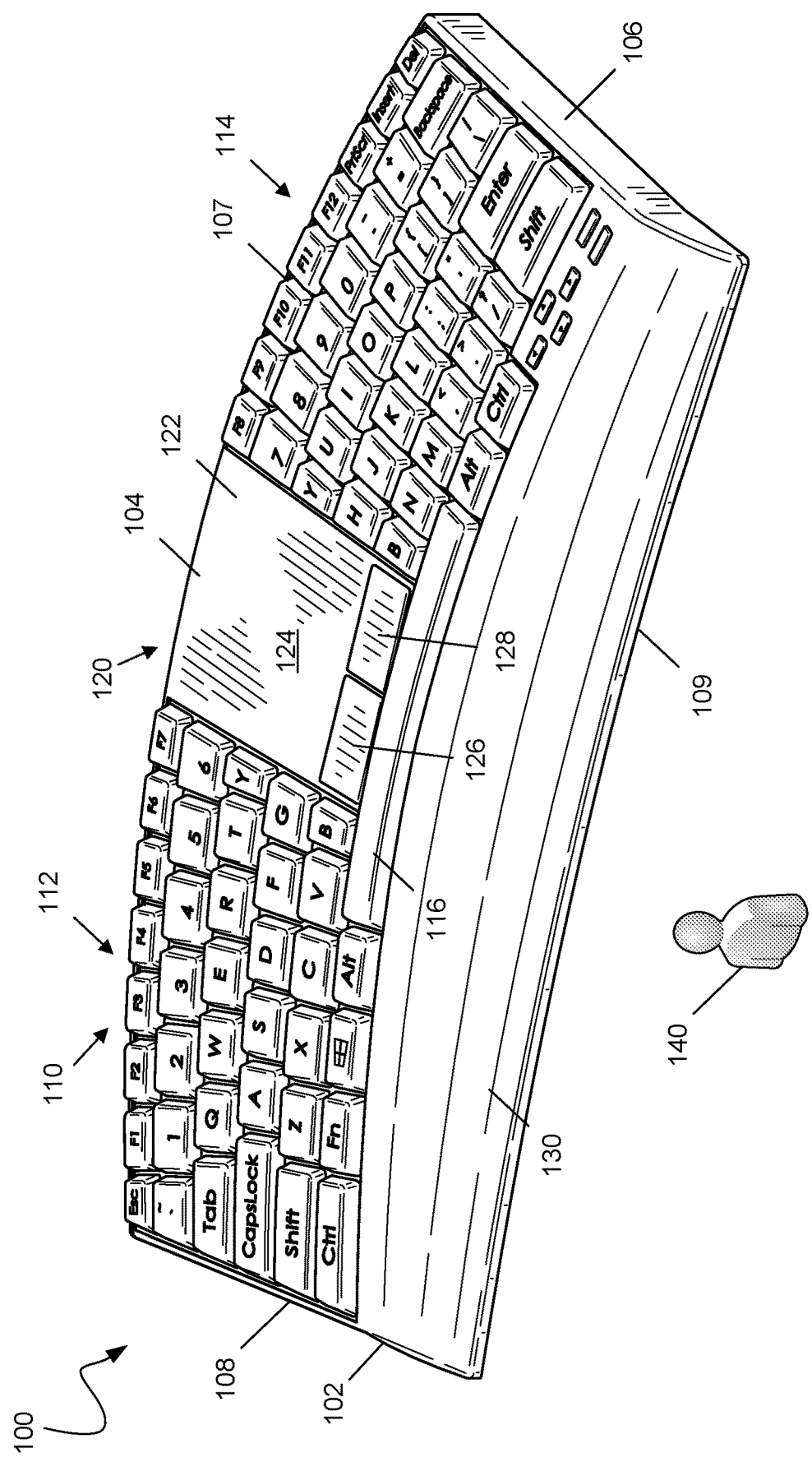
FIG. 1 is a perspective front view of a first embodiment of a keyboard.
Figure 2:
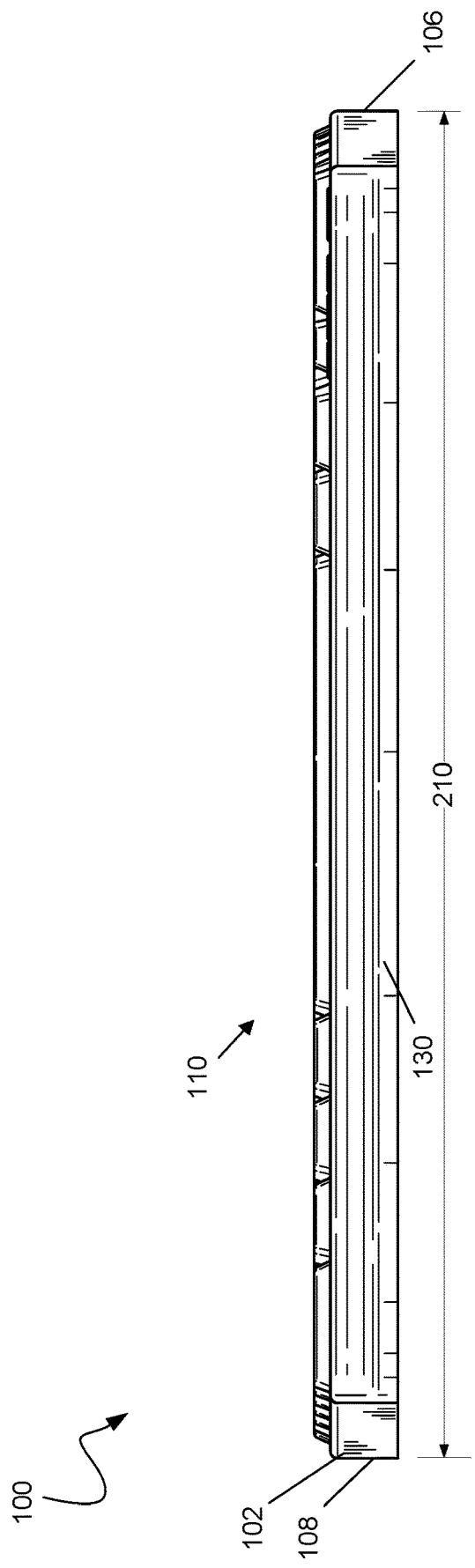
FIG. 2 is rear view of the keyboard of FIG. 1.
Figure 3:
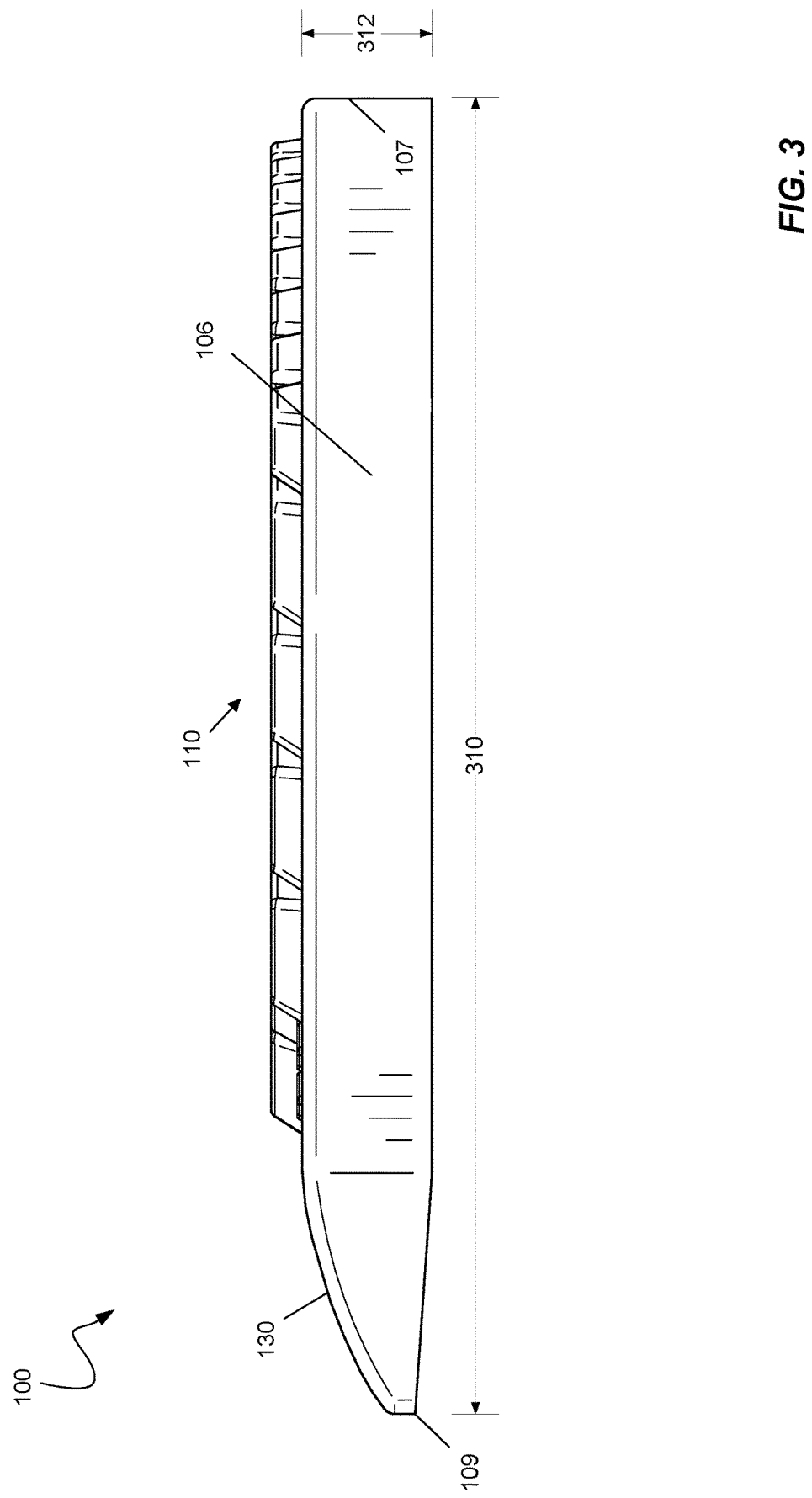
FIG. 3 is a side view of the keyboard of FIG. 1.
Figure 4:
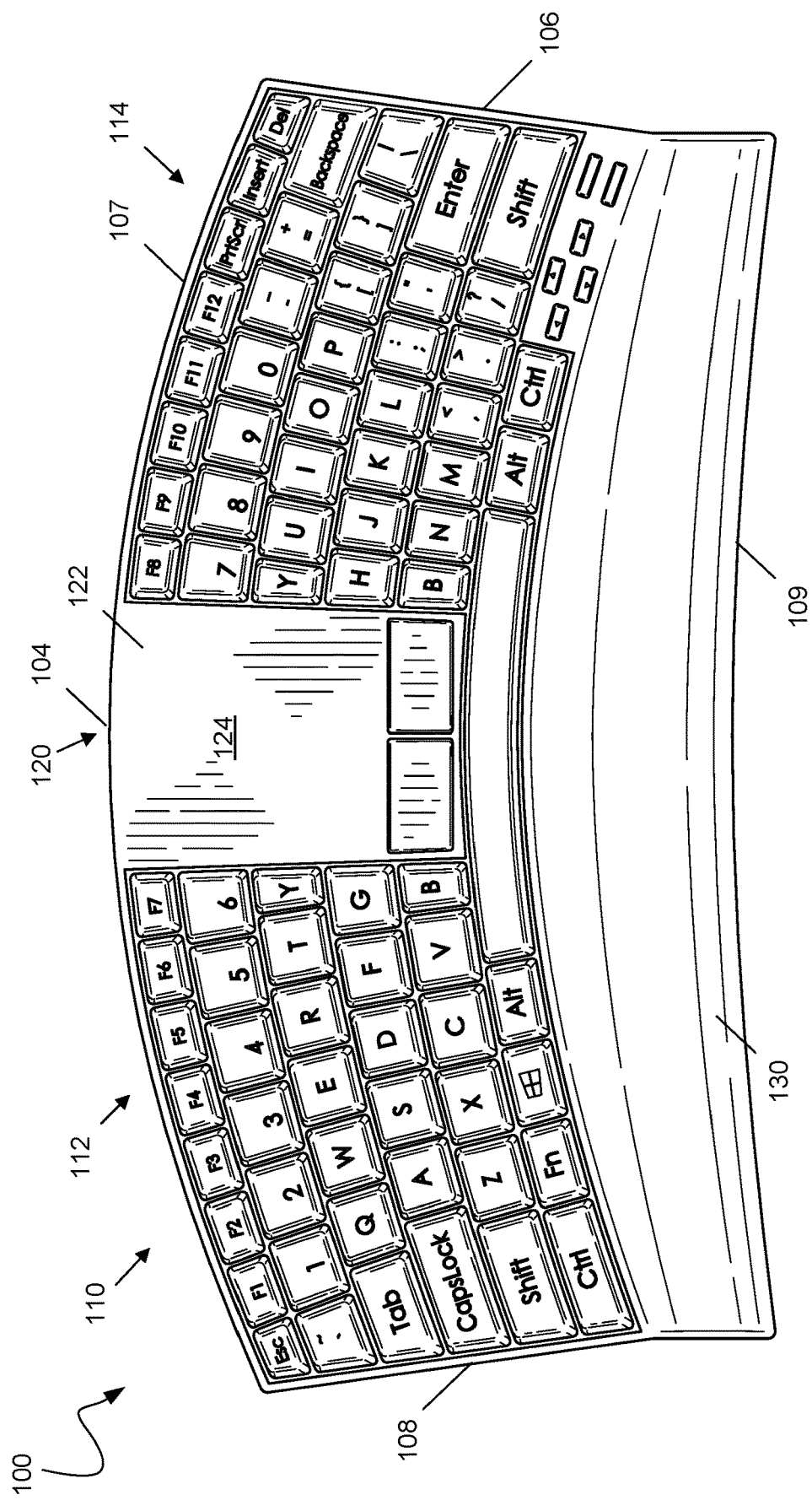
FIG. 4 is top view of the keyboard of FIG. 1.
Figure 5:
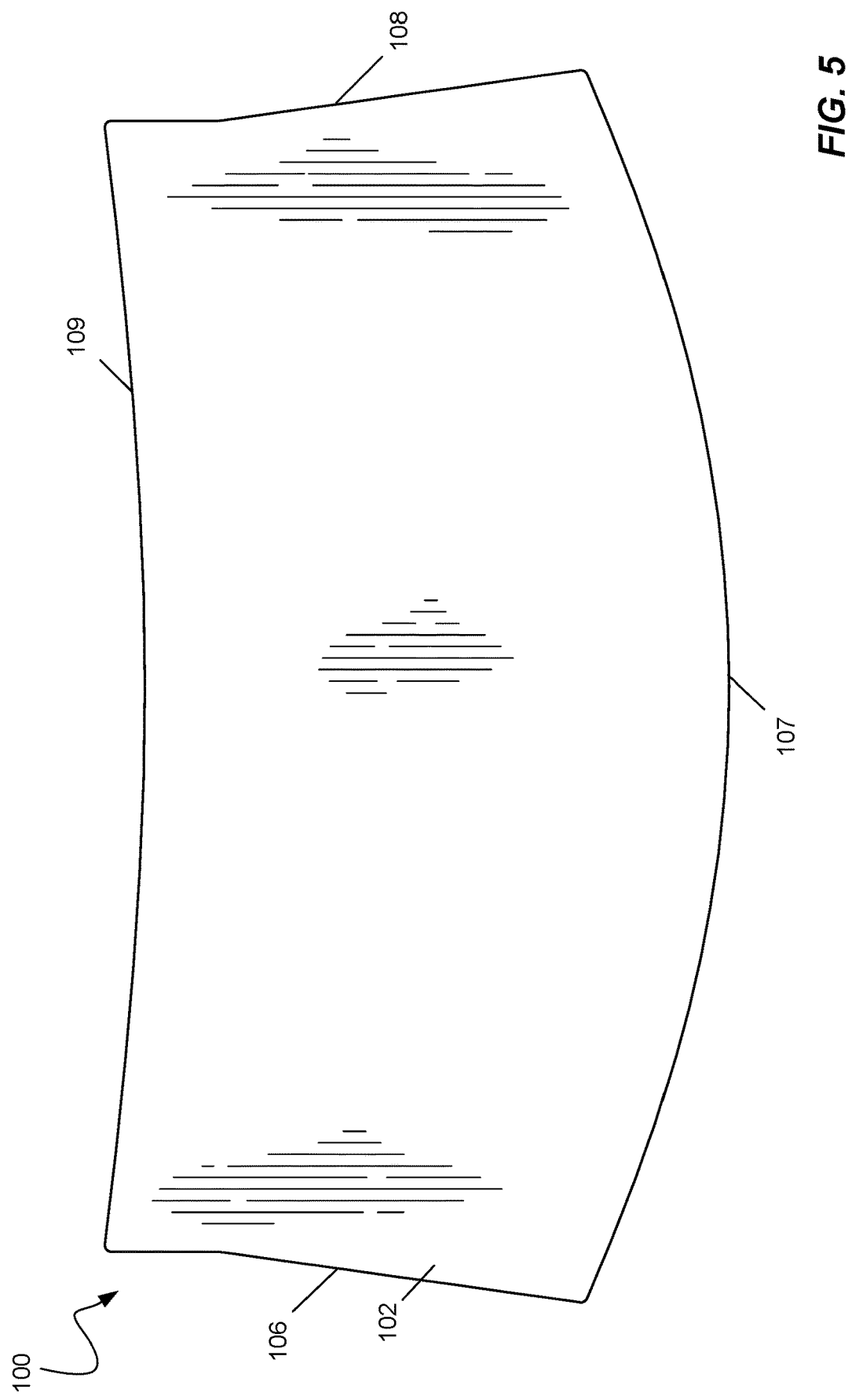
FIG. 5 is bottom view of the keyboard of FIG. 1.

Embodiments of the disclosure are directed to keyboards for computing devices.

A typical computing device includes a processor and memory. The memory encodes instructions that, when executed by the processor, allow the computing device to provide various functionality for work and play.

One input device for the computing device is a keyboard. Example keyboards are provided herein that optimize the ergonomic shapes of the keyboards.

The example keyboards provided herein can be hardwired to the computing devices, such as through a USB connection. Or, the keyboards can be wireless, using such protocols as Bluetooth or Wi-Fi. The keyboards include a plurality of keys. The keyboards can also include other devices, such as touchpads. Different possible configurations are provided below.

In some examples provided herein, the keyboards can be centered with a plurality of keys split by an input device at a midpoint of the keyboards. Examples of such input devices include touchpads and numeric keypads.

The keyboards are configured to be centered in front of users at the midpoints of the keyboards. In other words, the keyboards are designed to be located at a navel line of the user so that the users are positioned between the "G" and "H" keys, like with standard old-style typewriters. In some examples, the keyboards will include a palm rest.

One possible advantage of the keyboards provided herein is the curved or arced shape of the keyboards. This ergonomic feature of the examples keyboards results in a curve that starts at approximately a midpoint of the top side of the base and sweeps downward towards the ends of the keyboards. This configuration can allow for less movement for the wrists of the users and minimize twisting of the elbows. It can allow the user to more easily balance the keyboards to sit in the user's lap. Other possible advantages include making it easier for the user's fingers to reach the upper-level keys.

The keyboards can come in different colors and possibly have lit keys. The example keyboards can have bases that are curved or straight to accommodate the plurality of keys. One example base is rectangular or includes a top side that is curved and a bottom side that is linear.

Referring now to FIGS. 1-5, an example keyboard 100 is shown. The keyboard 100 includes a base 102 with a midpoint 104, first end 106, second end 108, top side 107, and bottom side 109.

A plurality of keys 110 are positioned on the base. The plurality of keys 110 can include alphabetic keys, number keys, control keys, etc. In the example shown, the plurality of keys 110 are curved along the base 102.

Specifically, the plurality of keys 110 close to the midpoint 104 are further from the user 140 of the keyboard 100, and the plurality of keys 110 curve towards the user 140 as the plurality of keys 110 extend towards the first end 106 and the second end 108, respectively. In other words, the plurality of keys 110 are placed on the base 102 so that the plurality of keys 110 form a curve as the plurality of keys 110 extend from the first end 106 to the second end 108 of the keyboard 100. In this example, the plurality of keys 110 are placed to follow a curved shape of the top side 107 of the base 102, although other configurations are possible.

In this example, the plurality of keys 110 are broken into two portions 112, 114. The two portions 112, 114 are positioned about the midpoint 104 of the base 102. An input device 120 is positioned at the midpoint 104. In this example, the input device 120 is a touchpad 122.

The example touchpad 122 includes a surface 124 that is touch-sensitive. The user 140 can place one or more fingers in contact with the surface 124 to manipulate the cursor on a display of a computing device. In addition, buttons 126, 128 of the touchpad 122 are provided for input, such as right and left buttons for input like a mouse for the computing device.

In this example, a spacebar 116 of the plurality of keys 110 spans the midpoint 104 of the base 102 of the keyboard 100. In other words, the spacebar 116 extends between the two portions 112, 114 of the plurality of keys 110 to make the spacebar 116 readily accessible.

In this example, the keyboard 100 also includes the palm rest 130 positioned at the bottom side 109 of the base 102. The palm rest 130 can be gradually elevated in height to allow for comfort as the palms of the user 140 rest on the palm rest 130 during use of the keyboard.

Generally, the base 102 of the keyboard 100 is sized to hold the plurality of keys 110 and provide other functionality, such as the input device 120 and/or the palm rest 130. In the example shown, the keyboard has a width 210, a depth 310, and a height 312.

The width 210 and the depth 310 are sized to provide sufficient surface area for the curved shape of the plurality of keys 110. In one example, the width 210 is 19 inches and the depth 310 is 9 inches. However, many other sizes and configurations are possible.

The height 312 can gradually increase from the bottom side 109 to the top side 107. In the example shown, the height 312 reaches a maximum of no greater than 3 inches. Many other sizes and configurations are possible.

As noted, a shape of the base 102 can vary as desired. In the example shown, the bottom side 109 and first and send ends 106, 108 are linear, and the top side 107 is curved generally to follow the curve of the plurality of keys 110. In other examples, the shape can be changed. For instance, in an alternative design, the bottom side 109 can also be curved to follow the plurality of keys 110.

The plurality of keys 110 can be positioned shall be in stages, with each row will about a 0.25 to 0.75 of an inch higher than the last one. The two portions 112, 114 can be configured to optimize reach for the keys of the plurality of keys 110. For instance, extra "B" and "Y" keys can be provided on both of the two portions 112, 114 that surround the input device 120 to allow for easier reach by the user 140.

In addition to standard keys for the keyboard 100, the keyboard 100 can include other specialized control keys. For instance, the keyboard can include monitor switches, so that the user can switch monitors just by push button. Further, the keyboard 100 can include one or more headphone jacks for listening of sound using a corded headset. Many different configurations are possible.

Figure 6:
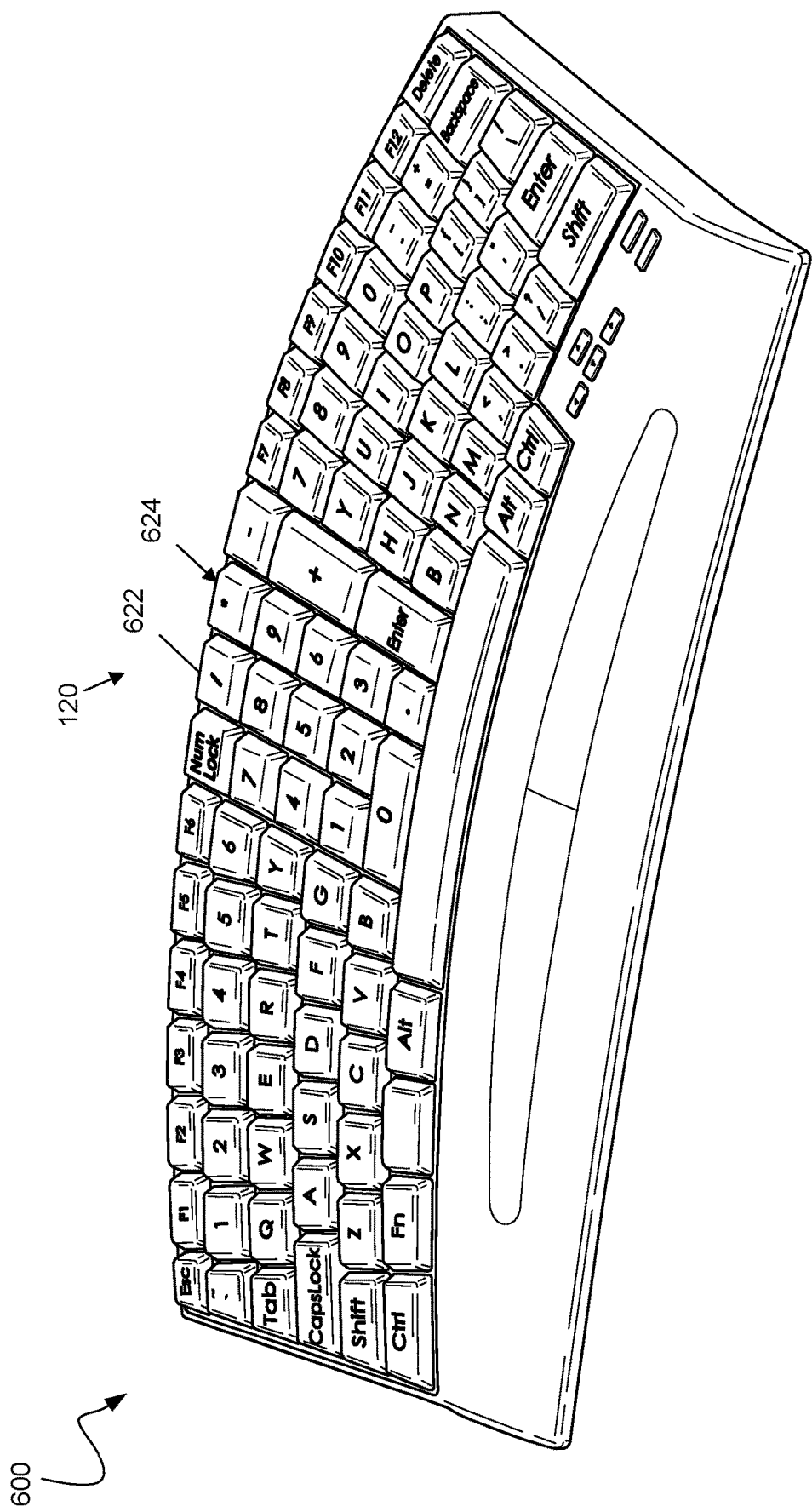
FIG. 6 is a perspective front view of a second embodiment of a keyboard.

Referring now to FIG. 6, another example keyboard 600 is shown. The keyboard 600 is similar to the keyboard 100 described above, except the keyboard 600 includes a numeric keypad 622 as the input device 120 (rather than the touchpad 122).

In this example, the numeric keypad 622 includes a plurality of keys 624. The plurality of keys 624 includes number keys, an enter key, a number lock key, and several mathematical operator keys (e.g., plus, minus, multiple, divide). The numeric keypad 622 facilitates the easy entry of numbers using the keyboard 600.

In some examples, the input device 120 is interchangeable on the keyboard 100. In such examples, the touchpad 122 and the numeric keypad 622 can each include a connector on an opposite side that engages a connector on the base 102 when the input device 120 is connected to and removed from the keyboard 100. Many other configurations are possible.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A keyboard, comprising:
    a base with:
        a minor axis between a front side nearest a user and a back side farthest from the user;
        a major axis perpendicular to the minor axis and between a first end and a second end opposite of the first end; and
        a midpoint positioned at the back side farthest from the user along the minor axis and equidistant between the first end and the second end opposite the first end along the major axis;
    an input device located at the midpoint of the base; and
    a plurality of keys arranged on the base, wherein the plurality of keys is positioned to form a curved shape on the base such that the plurality of keys extend from the input device at the midpoint of the base farthest from the user towards the user as the plurality of keys extends towards the first end in a first set and towards the second end of the base in a second set such that first keys of each of the first set and the second set are closest to the midpoint and are also closest to the back side, and second keys of each of the first set and the second set are closest to either of the first end or the second end and are also closest to the front side.

2. The keyboard of claim 1, wherein the input device is a numeric keypad.

3. The keyboard of claim 1, wherein the input device is a touchpad.

4. The keyboard of claim 3, wherein the touchpad includes a touch surface and at least two input buttons.

5. The keyboard of claim 1, wherein a spacebar of the plurality of keys extends across the midpoint of the base.

6. The keyboard of claim 1, further comprising a palm rest positioned on the base.

7. The keyboard of claim 1, wherein the base increases in height as the base extends from the front side of the base to the back side of the base.

8. A method of forming a keyboard, comprising:
    providing a base with:
        a minor axis between a front side nearest to a user and a back side farthest from the user,
        a major axis perpendicular to the minor axis and between a first end and a second end opposite the first end, and
        a midpoint positioned equidistant between the first end and the second end along the major axis and at the back side along the minor axis;
    providing an input device located at the midpoint of the base; and
    arranging a plurality of keys on the base, wherein the plurality of keys is positioned to form a curved shape on the base such that the plurality of keys extend from the input device at the midpoint of the base farthest from the user towards the user as the plurality of keys extends towards the first end in a first set and towards the second end of the base in a second set such that first keys of each of the first set and the second set are closest to the midpoint and are also closest to the back side, and second keys of each of the first set and the second set are closest to either of the first end or the second end and are also closest to the front side, and the midpoint of the base is elevated relative to the first end and the second end of the base.

9. The method of claim 8, wherein the input device is a numeric keypad.

10. The method of claim 8, wherein the input device is a touchpad.

11. The method of claim 10, wherein the touchpad includes a touch surface and at least two input buttons.

12. The method of claim 8, wherein a spacebar of the plurality of keys extends across the midpoint of the base.

13. The method of claim 8, further comprising positioning a palm rest on the base.

14. The method of claim 8, wherein the base increases in height as the base extends from the front side of the base to the back side of the base.

\* \* \* \* \*